Nov. 9, 1965
L. NAGY
3,216,276
VARIABLE RATIO BRAKE ACTUATOR
Filed Aug. 19, 1960
3 Sheets-Sheet 1
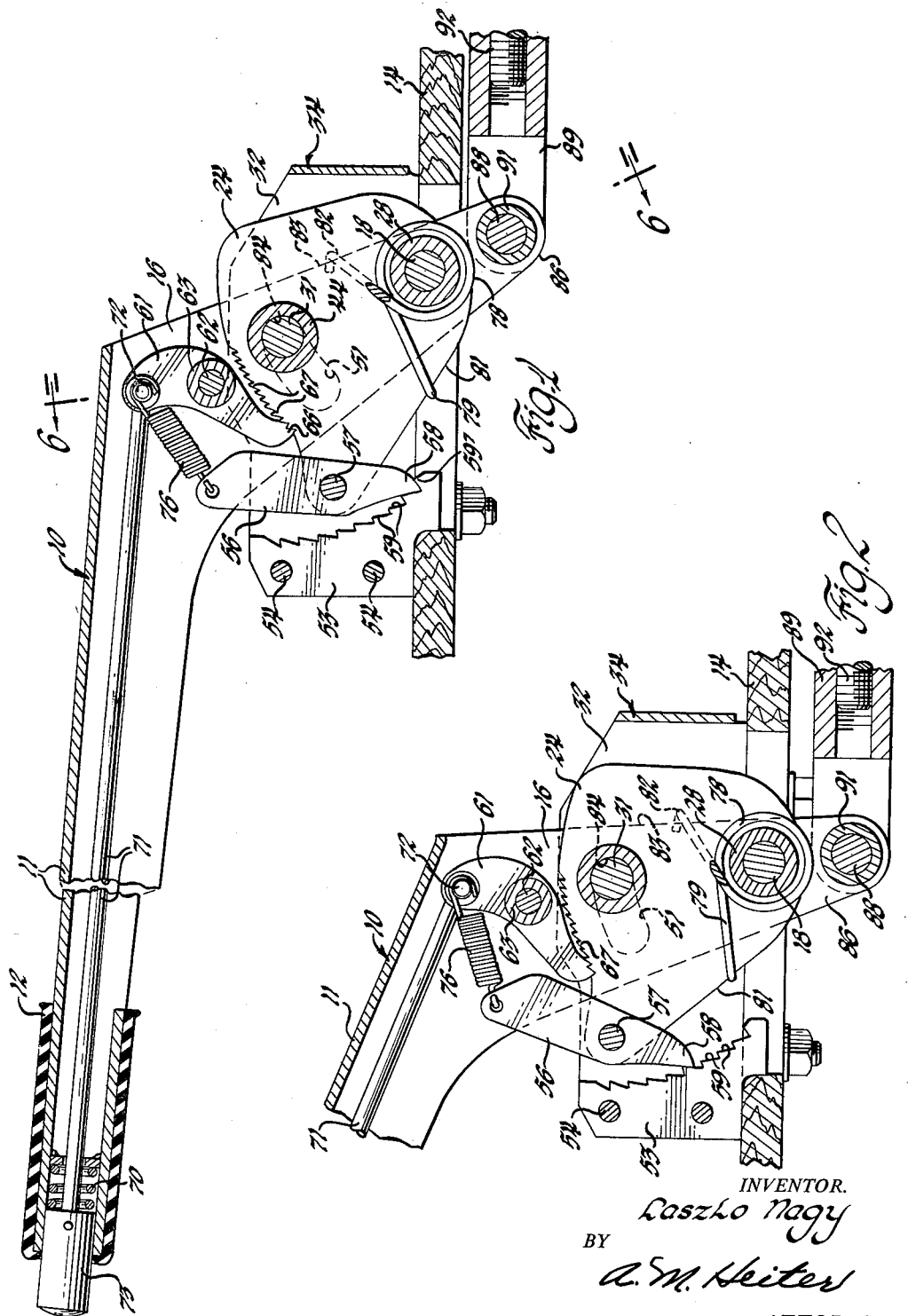
INVENTOR.
Laszlo Nagy
BY
A. M. Heiter
ATTORNEY Nov. 9, 1965   L. NAGY   3,216,276
VARIABLE RATIO BRAKE ACTUATOR
Filed Aug. 19, 1960   3 Sheets-Sheet 2
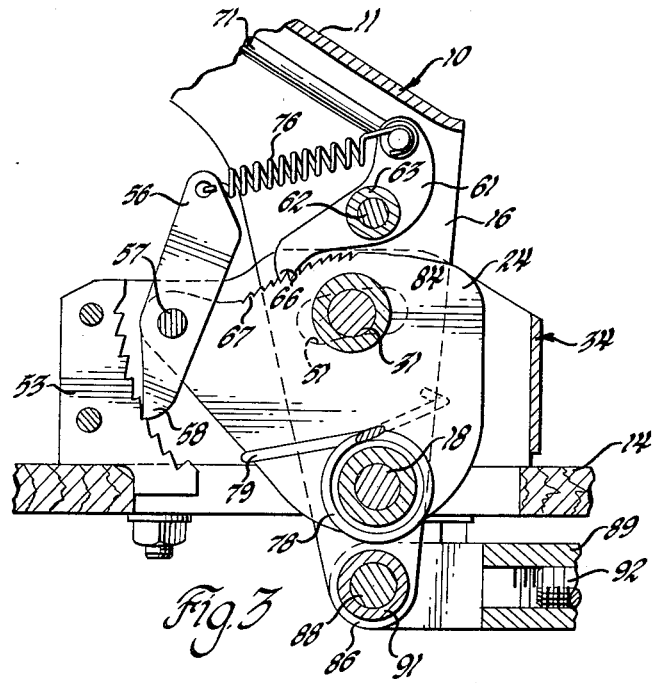
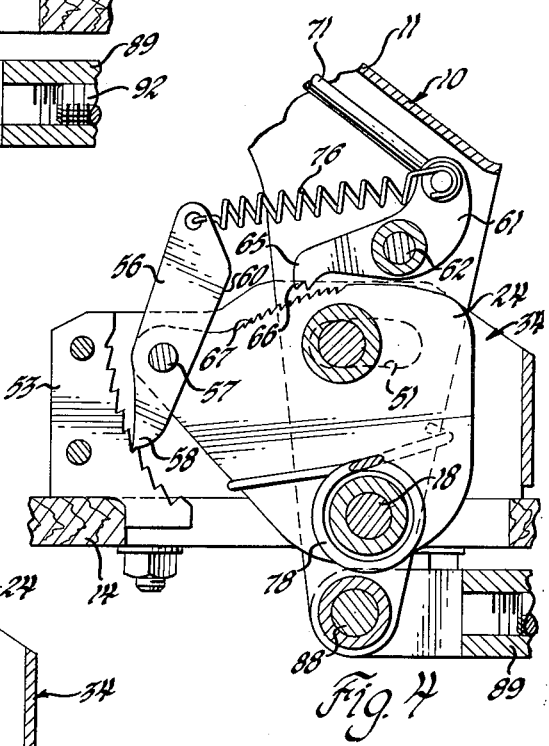
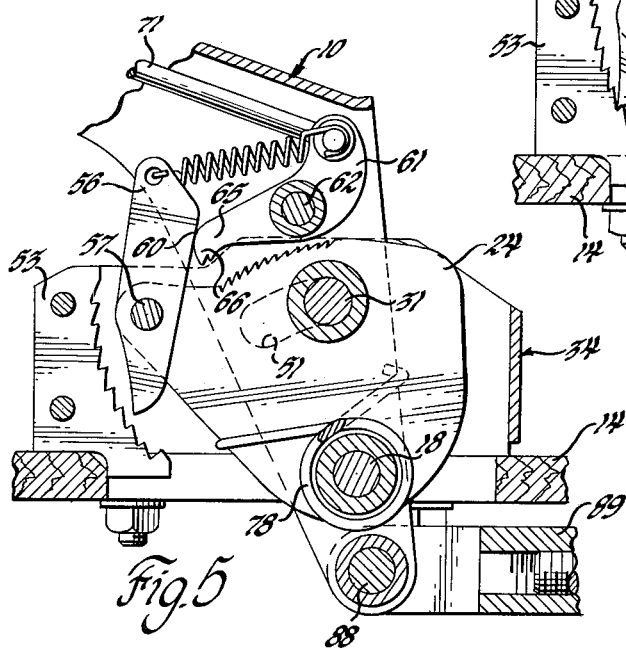
INVENTOR.
Laszlo Nagy
BY
A.M. Heiter
ATTORNEY

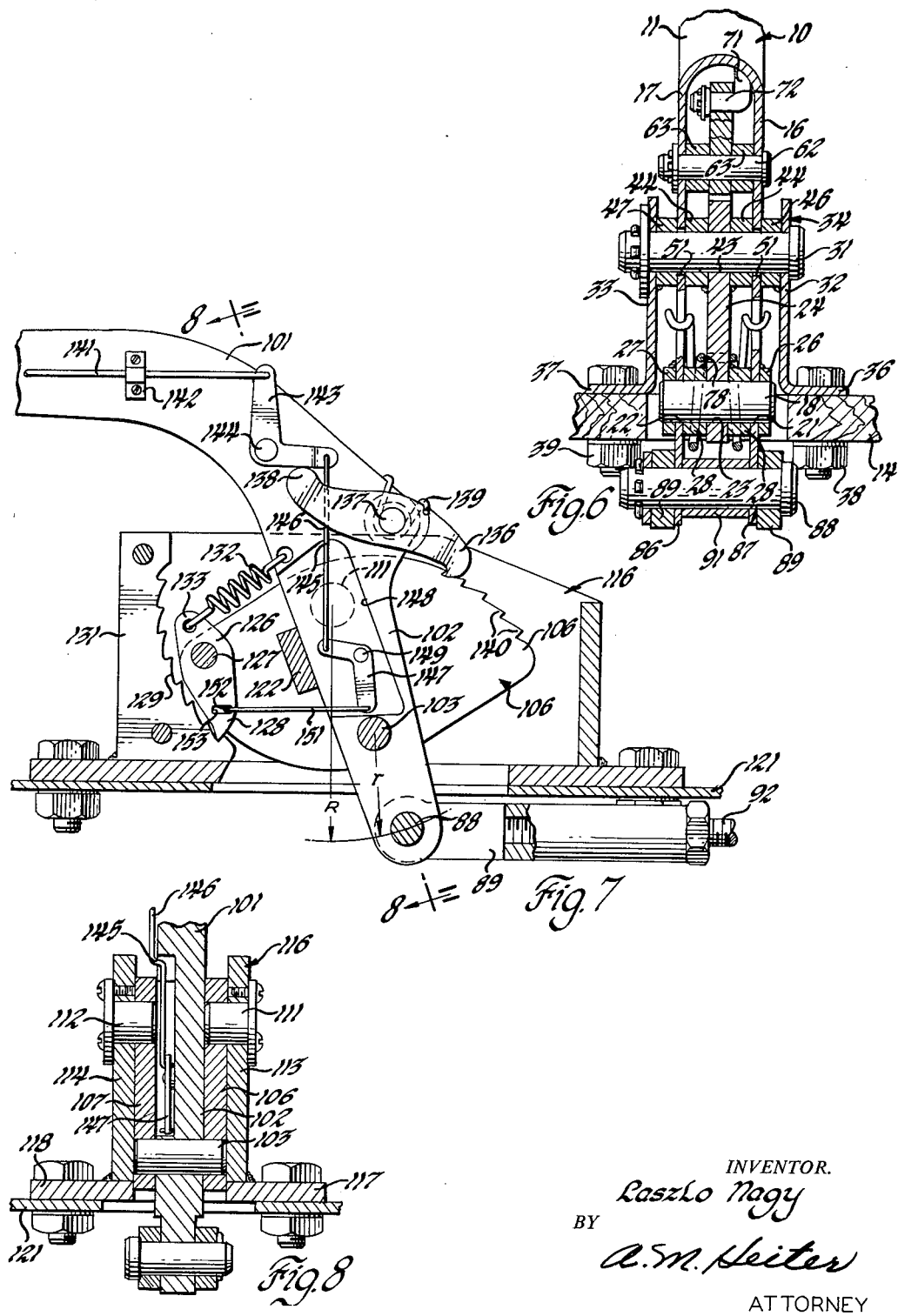

United States Patent Office 3,216,276
Patented Nov. 9, 1965

3,216,276
VARIABLE RATIO BRAKE ACTUATOR
Laszlo Nagy, Detroit, Mich., assignor to General Motors Corporation, Detroit, Mich., a corporation of Delaware
Filed Aug. 19, 1960, Ser. No. 50,778
17 Claims. (Cl. 74—516)

This invention relates to brake levers and more particularly to a dual ratio single stroke ratchet type brake lever.

In braking systems for general service brake application and particularly auxiliary brake application for parking, emergency and retarding use, it is desirable to provide a brake lever that will operate within a limited range of movement, provide a high degree of force multiplication, and move the brake control linkage the required distance. In order to reduce the range of movement of the brake lever during a single stroke brake application movement and provide sufficient force multiplication, it is desirable to employ a brake lever mechanism providing two force multiplication ratios during the brake application movement. During the initial portion of the brake application movement, that employed to take up the slack in the brake linkage and applying mechanism, the hand lever mechanism provides a low force multiplication ratio so that a small movement of the hand lever provides a relatively large movement of brake apply mechanism. Since only a small brake apply force is required during the slack take-up portion of the brake apply member movement, a small force multiplication between the hand lever and the brake linkage is sufficient. The low leverage is used so that the large amount of movement required to take up the slack in the brake mechanism may be obtained by a small movement of the hand lever. When the slack in the brake linkage and brake mechanism is taken up, a large brake application force is required to apply the brakes. The leverage changing mechanism of the brake lever mechanism automatically changes to a high ratio leverage so that thereafter a large amount of movement of the hand lever is required for a relatively smaller amount of movement of the brake mechanism. In this way the manual brake force applied to the brake lever is multiplied to provide a large brake application force. A small movement of this brake lever provides a large slack take-up movement of the brake mechanism to reduce the overall brake apply movement of the lever.

The brake lever is pivotally mounted on a sector which is rotatably mounted on the vehicle frame. A spring holds the brake lever and sector in an initial position during brake movement to take up slack in the brake linkage. When the brake application force reaches a value sufficient to move the spring, the brake lever pivots about a new center on the sector to provide a higher mechanical advantage between the hand lever and the brake mechanism to multiply the brake lever force applied to the brake mechanism.

An object of the invention is to provide in a brake lever mechanism, a brake lever pivotally mounted on a sector which is pivotally mounted on the frame and the spring to resiliently hold the brake lever and sector in an initial low mechanical advantage position during brake slack take-up movement and to permit relative movement of the brake lever and sector in response to a predetermined brake apply force to provide a higher mechanical advantage.

Another object of the invention is to provide in a single stroke dual ratio brake lever, a simplified arrangement consisting of a lever pivoted to a sector to provide an initial low mechanical advantage and a high mechanical advantage in response to the force being transmitted.

Another object of the invention is to provide in a brake lever mechanism a brake lever pivotally mounted on a sector, a sector pivotally mounted on the frame, a spring to hold the brake lever and sector in a normal position until the brake reaction force reaches a predetermined value, a pawl to hold the brake lever relative to the sector and a pawl to hold the sector relative to the frame and a single spring to urge both pawls into engagement.

These and other objects of the invention will be more apparent from the following description and drawings of the preferred embodiment of the invention.

FIGURE 1 is a sectional view of the brake lever in release position.

FIGURE 2 is a partial sectional view showing the brake lever during slack take-up movement.

FIGURE 3 is a partial sectional view of the brake lever during brake application movement.

FIGURE 4 is a sectional view of the brake lever during the initial portion of the release movement.

FIGURE 5 is a sectional view of the brake lever to show the final phase of brake release movement.

FIGURE 6 is a sectional view of FIGURE 1 on the lines 6—6.

FIGURE 7 is a partial sectional view of a modification.

FIGURE 8 is a sectional view of FIGURE 7 on the line 8—8.

The dual ratio brake lever mechanism is illustrated in connection with a hand brake lever for emergency brake use on a vehicle. The hand brake lever 10 has a generally tubular section 11 having force input means such as a handle 12 at one end and a force transmitting portion including a pair of legs 16 and 17 formed as continuations of the side wall of the brake lever. In the preferred form of the invention shown in FIGURE 1 the handle 12 lies parallel to the vehicle floor 14 and the extensions 16 and 17 extend downwardly at an angle from the hand lever. The hand lever 10 is pivotally supported on the sector 24 by pivot means such as the pin 18 which extends through the circular apertures 21 and 22 in the central portion of the walls 16 and 17 respectively of the lever. The pin 18 is rotatably mounted in an aperture 23 in the sector 24. The reinforcing and bearing members 26 and 27 are secured preferably by welding to the legs 16 and 17 concentric with the apertures 21 and 22. The spacing and bearing members 28 are preferably secured by welding to the sector 24 concentric with aperture 23.

The sector 24 is rotatably supported on the housing or support 34 by pivot means such as the support pin 31 which is supported in the opposite walls 32 and 33 of housing 34. The walls 32 and 33 have suitable flanges 36 and 37 at the bottom so that the housing 34 may be secured by bolts 38 and 39 to the vehicle frame 14. The pin 31 extends through an aperture 43 in the sector 24. The bearing surface of aperture 43 is increased by welding bearing members 44 on each side of the sector concentric with aperture 43. The bearing members 46 and 47 are welded to housing walls 32 and 33 respectively. The side walls 16 and 17 of the brake lever 10 are guided respectively between bearing members 46 and 44 and bearing members 44 and 47 for movement relative to the pin 31 as permitted by the slots 51 in the leg 16 and the leg 17. The above assembly including the sector 24 and its pivot pin 31 to the housing 34 and the pivot pin 18 to the lever 10 provides pivot supporting means pivotally supporting the lever on the housing or support for pivotal movement on either one axis at pivot pin 18 or another axis at pivot pin 31.

The housing 34 has at the end adjacent the handle 12 of hand lever 10 holding means including a sector 53 having ratchet teeth 59 cooperating with pawl 56 which is pivotally mounted by a pin 57 to the sector 24. The sector 53 is suitably secured by fasteners 54 to the housing 34 and forms one end wall of the housing. The pawl tooth 58 is arranged to engage any one of the sector teeth 59.

The brake lever pawl 61 is suitably pivoted by a pin 62 to the walls 16 and 17 of the brake lever 10. The spacers 63 keep the pawl 61 in alignment with sector 24. The pawl 61 has one or two ratchet teeth 66 which engage a series of ratchet teeth 67 on the sector 24 and provides holding means to hold lever 10 in a plurality of adjusted positions with respect to sector 24. A push rod 71 extending through the hollow tubular portion 11 of the hand lever has an offset portion 72 fitting into an aperture in the operator end of pawl 61. A push button 73 fixed to the rod 71 and reciprocally mounted in the end of the hollow handle 11 is pushed inwardly to rotate pawl 61 clockwise to release the pawl. A spring 76 connected between the operated ends of pawls 61 and 56 urges both pawls into engaged position. A spring 70 may also be employed to return the push rod 71. Spring 76 may be eliminated by employing a coil spring on pin 57 to rotate pawl 56 into engagement with sector 53.

A coil spring 78 is wrapped around the bearing 28 surrounding pin 18 with the center portion and both end portions crossing each other above pin 18 to provide control means to shift the lever 10 from pivotal movement about pin 31 to movement about pin 18 in response to the amount of force transmitted by the lever. The center portion 79 crosses the left edge 81 of sector 24 (FIG. 1 to engage the sector as one anchor point. The free ends 82 of the spring 78 engage the edges 83 of legs 16 and 17 of lever 10 to urge the lever 10 to rotate relative to the sector 24 so that stop means provided by the right end 84 of slot 51 engages the pin 31 to maintain the sector 24 in lever 10 in the relative position shown in FIGURE 1 when relatively light loads are being transmitted by the linkage. The assembly including spring 78, pawl 56 and ratchet teeth 59 provides pivot shift means operative on the pivot supporting means to move the pivot of lever 10 from one to another axis.

The operating end 86 of lever 10 has force output means including an aperture 87 to receive the pin 88 which passes through an aperture in the clevis 89. A spacer and bearing sleeve 91 suitably welded to the lever walls 16 and 17 adds rigidity to the operating end of the lever 10. The brake operating linkage such as the rod 92 is suitably secured to the clevis 89.

The brake linkage mechanism is normally in the released position shown in FIGURE 1. The pawl 56 engages the ratchet 53 to hold the sector 24 in the extreme position of counterclockwise movement. The last tooth 59' of teeth 59 may be enlarged as shown or a rubber bumper placed on the frame 34 to engage lever 10 to limit counterclockwise movement at the position shown in FIG. 1. The coil spring 78 positions the hand lever 10 in the extreme position of counterclockwise or brake release movement where the ends 84 of slots 51 in lever 10 engage pin 31.

During the initial phase of brake application to take up slack and apply a small force to the brake mechanism, hand lever 10 is rotated clockwise as shown in FIG. 2 and pivots about the axis of pin 31. Since only light brake apply forces are being transmitted to take up slack the spring 78 has sufficient strength to hold the lever 10 in the same position as shown in FIGURES 1 and 2 relative to the sector 24 with the ends 84 of slots 51 in the lever 10 engaging the pin 31 which is pivoted to sector 24 and housing 34. The lever 10 and sector 24 move together so long as the force being transmitted does not overcome the tension of spring 78. From the fully released position shown in FIGURE 1 through partially applied positions illustrated by FIGURE 2, the pawl 56 ratchets on the sector 53. It will be noted that the pawl 61 and sector teeth 67 on sector 24 are inactive during this phase of movement since there is no relative movement between handle 10 and sector 24. During this phase of brake application with the brake lever 10 rotating around pin 31, the distance between pin 31 and pin 88 illustrates the lever arm between the pivot point and the force application point to the brake lever system. This large radius moves the brake apply mechanism a relatively large distance to take up the slack in the brake linkage and mechanism. Though this is done at the sacrifice of force multiplication it will be appreciated that high force multiplication is not necessary during initial slack take-up portion of brake application movement.

When the reaction force of the brake is sufficient to overcome the torque of spring 78, the sector 24 will tend to move counterclockwise and the pawl 56 will engage the ratchet 53 to transfer this reaction force to the vehicle frame. Then the brake lever 10 will rotate about the axis of pivot pin 18 which is fitted in circular apertures in both the sector 24 and the brake lever 10. The slots 51 in the brake lever 10 permit relative movement of the brake lever 10 relative to the pin 31 and sector 24. When the brake lever 10 moves relative to sector 24, the pawl 61 rides over the ratchet teeth 67 on the sector 24 and on termination of movement is engaged by the spring 76 to hold the brake in the applied position. During this phase of brake application, the sector 24 is in a fixed position since it is pivoted by pin 31 to the frame 34 and held against counterclockwise rotation by pawl 56 and sector 53. Also, during this phase of brake application movement, spring 78 is continuously compressed.

When it is desired to release the brakes the push button 73 is pressed inwardly to rotate the pawl 61 clockwise lifting pawl tooth 66 from the ratchet teeth 67 on sector 24 permitting releasing or counterclockwise movement of brake lever 10. During releasing movement of the lever 10 the nose 65 of pawl 61 engages a surface 60 on pawl 56 to disengage pawl 56 and permit the sector 24 and the lever 10 to return to the normal fully disengaged position shown in FIG. 1.

The modification shown in FIG. 7 has a hand lever 101 with an angular end portion 102 pivoted by a pin 103 to a two-part sector 104. The lower end of the lever 101, as in FIG. 1, is connected by a pin 88, and clevis 89 to a brake rod 92. The sector 104 has a right part 106 and a left part 107 as best shown in FIG. 8 and is pivoted by pins 111 and 112 to the walls 113 and 114 of the housing 116. The walls 113 and 114 of housing 116 have suitable flanges 117 and 118 to support and secure the housing to the vehicle frame 121. A stop member 122 suitably secured to the sector members 106 and 107 limits counterclockwise movement of the lever 101 relative to the sector 104.

A pawl 126 pivotally mounted by a pin 127 on sector 104 has a tooth 128 engaging the teeth 129 of sector 131. A coil spring 132 connected between the tail end 133 and the pawl 126 and the brake lever 101 urges the tooth 128 of pawl 126 into contact with sector 131 and holds the brake lever 101 in its normal position against the stop 122 on the sector 104. The pawl engaging force of spring 132 is low as compared to the force between lever 101 and sector 104 because of the small lever arm between pawl pivot 127 and the anchor point of spring 132 to pawl 126. A second pawl 136 having an ear 138 is pivotally mounted by pin 137 on the brake lever 101.

A coil spring 139 wrapped around pin 137 engages pawl 136 and lever 101 to urge pawl 136 clockwise into engagement with teeth 140 of sector 104. The brake release rod 141 is supported in a guide 142 and actuated by a spring biased button as shown in FIG. 1 and is normally biased to the release position shown. The rod 141 is pivotally connected to one arm of a bell crank lever 143 pivoted by pin 144 to brake lever 101. The other arm of bell crank lever 143 engages ear 138 of pawl 136 and is connected by rod 146 to one arm of bell crank lever 147 which is located in recess 148 in brake lever 101 and centrally pivoted by pin 149 to the brake lever. The other arm of bell crank lever 147 is connected by a rod 151 to pawl 126. The rods 141, 146 and 151 have right angle end portions fitting into apertures in the levers to provide pivotal connections. The ear 138 of pawl 136 has a reduced width so the rod 146 can pass between lever 101 and ear 138. The rod 146 has an offset 145 to freely reach into recess 148 in all positions of the brake lever. The end of rod 151 connected to pawl 126 has a right angle portion or pintle 152 fitting into a slot 153. With the brake lever in the released position as shown in FIG. 7, the slot 153 has sufficient clearance to the left of the pintle 152 to permit free ratcheting movement of pawl 126. The pivot point between bell crank lever 147 and rod 151 is located as close as possible to the axis of pin 103 so that during brake application this pivot point moves as little as possible. The slot 153 also has a small clearance to the right of pintle 152 to prevent movement of pawl 126 due to movement of lever 101 about pin 103.

The operation of the brake lever arrangement shown in FIG. 7 is similar to that shown in FIG. 1. The brake lever is shown in normal brake release position. During the initial brake slack take-up movement of lever 101, the lever 101 and the sector 104 rotate together about the pivot pins 111–112 to apply the brake with a long radius R providing low torque multiplication with a large degree of movement of the apply mechanism. During this initial phase of brake slack take-up movement, the spring 132, which connects the brake lever 101 through pawl 126 to sector 104, holds the sector and brake lever in the relative position shown with stop 122 engaging the brake lever 101 so that the lever 101 and the sector 104 rotate in a clockwise direction together or as a unit. When the force transmitted by the brake lever overcomes the force of spring 132, the pawl 126 engages the sector 131 to hold the sector 104 in an intermediate position. Thereafter the lever 101 rotates about pin 103 to provide brake application about a smaller radius r to provide increased torque multiplication and move the brake mechanism a relatively small distance with each increment of brake movement. During this phase of operation brake lever 101 moves away from stop 122 pivoting about pin 103. The sector 104, due to the fact that it is pivotally mounted to pins 111 and counterclockwise rotation is prevented by pawl 126 and sector 131, remains in a stationary position. The pawl 136 ratchets over the teeth 140 on sector 104 to hold the brake lever in applied position.

To release the brake, the release button is depressed to move rod 141 to the right and rotate bell crank 143 clockwise to engage the ear 138 of pawl 136 to release the pawl. Also, the rod 141 acting through bell crank 143, rod 146, bell crank 147 and rod 151 releases pawl 126 to permit the lever 101 to return to the released position.

The above described preferred embodiments are illustrative of the invention which may be varied by those skilled in the art within the scope of the appended claims.

I claim:

1. In a lever mechanism, a support, a member, first pivot means pivotally mounting said member on said support for movement about a first axis, a lever having spaced force input means and force output means and a central portion, second pivot means pivotally mounting said lever on said member for relative movement therebetween about a second axis spaced from said first axis, means on said support and member to prevent movement in one direction of said member, said lever having stop means for engaging said first pivot means to limit relative movement of said lever and member in said one direction, and means connected between said lever and member urging said stop means against said first pivot means to transmit a predetermined force without relative movement between said lever and member and thereafter to permit relative movement between said lever and member in the opposite direction.

2. In a brake lever mechanism, a support, a member, first pivot means pivotally mounting said member on said support for movement about a first axis, a brake lever having spaced force input means and force output means and a central portion, second pivot means pivotally mounting said brake lever on said member for relative movement therebetween about a second axis spaced from said first axis, a ratchet on said support and a pawl on said member to prevent movement in one direction of said member, said brake lever having a slot receiving said first pivot means and providing a stop for engaging said first pivot means to limit relative movement of said brake lever and member in said one direction, a preloaded spring means connected between said brake lever and member urging said stop against said first pivot means to transmit a predetermined minimum force without relative movement between said brake lever and member and thereafter to permit relative movement between said brake lever and member in the opposite direction, pawl and ratchet means operatively connected between said brake lever and member to prevent relative movement in said one direction, and means to release both pawls.

3. In a brake lever mechanism, a support, a member, first pivot means pivotally mounting said member on said support for movement about a first axis, a brake lever having a handle end, a brake operating end and a central portion, second pivot means pivotally mounting said brake lever on said member for relative movement therebetween about a second axis spaced from said first axis, means on said support and member to prevent movement in one direction of said member, said brake lever and member having a pin and slot connection to limit relative movement of said brake lever and member in said one direction, means connected between said brake lever and member operating on said pin and slot connection to transmit a predetermined minimum force without relative movement between said brake lever and member and thereafter to permit relative movement between said brake lever and member in the opposite direction, and means to anchor said member during relative movement of said lever and member.

4. The invention defined in claim 3 and means operatively associated with said lever and member to prevent reverse relative movement of said lever and member.

5. In a brake lever mechanism, a support, a member, first pivot means pivotally mounting said member on said support for movement about a first axis, a brake lever, second-pivot means pivotally mounting said brake lever on said member for relative movement therebetween about a second axis, said brake lever having spaced force input means and force output means, said first axis being located a predetermined distance from said force output means, said second axis being located a distance less than said predetermined distance from said force output means, spring loaded pin and slot means operatively connecting said member and said lever to cause said member and lever to move together and pivot about said first axis and operative in response to a predetermined force reacting on said force output means to permit said lever to move relative to said member about said second axis to provide a larger mechanical advantage, and a first holding means connected between said member and support to non-rotatably anchor said member to said support in response to relative movement between said lever and member.

6. In a brake lever mechanism, a support, a member, first pivot means pivotally mounting said member on said support for movement about a first axis, a brake lever, second pivot means pivotally mounting said brake lever on said member for relative movement therebetween about a second axis, said brake lever having spaced force input means and force output means, said first axis being located a predetermined distance from said force output means, said second axis being located a distance less than said predetermined distance from said force output means, said member and said lever having a pin and slot connection loaded by a spring to cause said member and lever to move together and pivot about said first axis and operative in response to a predetermined force reacting on said force output means to permit said lever to move relative to said member about said second axis to provide a larger mechanical advantage, a first holding means connected between said member and support to nonrotatably anchor said member to said support in response to relative movement between said lever and member, second holding means operatively associated with said lever and member operative to hold said lever in a plurality of adjusted positions with respect to said member, and means operatively associated with said first and second holding means and said control means operative to release said first and second holding means and to actuate said control means to permit return movement of said lever and member.

7. In a lever mechanism, a support, a member, first pivot means rotatably supporting said member on said support, a lever having spaced force input means and force output means, second pivot means rotatably supporting said lever on said member spaced from said first pivot means, the moment arm from the output force acting at said force output means to said first pivot means being larger than the moment arm to said second pivot means, the reaction force on said second pivot means of the input and output forces during rotation of said lever in one direction tending to rotate said member in the opposite direction, said lever and member having a pin and slot connection loaded by a spring for rotating said member with said lever in said one direction to transmit a small reaction force from said second pivot means through said member to said first pivot means to provide a large moment arm from the effective first pivot means to the force output means for a small reaction force and to tend to permit a large reaction force to rotate said member relative to said lever, in said opposite direction, and means operatively associated with said member and support operatively associated with said first and second holding means and said control means operative to prevent rotation of said member in said opposite direction operative in response to a large reaction force to cause said lever to rotate about said second pivot means relative to said support operative to provide a small moment arm from the effective second pivot means to the output force for a large reaction force.

8. In a lever mechanism, a support, a member, first pivot means rotatably supporting said member on said support, a lever having spaced force input means and force output means, second pivot means rotatably supporting said lever on said member spaced from said first pivot means, the moment arm from the output force applied at said force output means to said first pivot means being larger than the moment arm to said second pivot means, the reaction force on said second pivot means of the input and output forces during rotation of said lever in one direction tending to rotate said member in the opposite direction, said lever having a slot receiving said first pivot means, said slot providing a stop for engaging said first pivot means, biasing means urging said stop against said first pivot means for rotating said member with said lever in said one direction to transmit a small reaction force from said second pivot means through said member to said first pivot means to provide a large moment arm from the effective first pivot means to the force output means for a small reaction force and to tend to permit a large reaction force to rotate said member relative to said lever in said opposite direction, first holding means connected between said member and support to prevent rotation of said member in said opposite direction operative in response to a large reaction force to cause said lever to rotate about said second pivot means relative to said support to provide a small moment arm from the effective second pivot means to the force output means for a large reaction force, and second holding means connected between said lever and member to prevent rotation of said lever relative to said member in said opposite direction.

9. The invention defined in claim 8 and means operatively associated with both holding means operative to disengage both holding means.

10. The invention defined in claim 8 and a single spring operatively associated with both holding means operative to bias both holding means to the holding position.

11. The invention defined in claim 8 and said biasing means also actuating one holding means.

12. In a linkage, a support, a member, first pivot means rotatably supporting said member on said support, a lever having spaced force input means and force output means, second pivot means rotatably supporting said lever on said member, said second pivot means being closer to said force output means than said first pivot means, said second pivot means being spaced from said first pivot means, the reaction force on said second pivot means during force transmitting movement of said lever causing rotation of said member in one direction, said lever having a slot receiving said first pivot means, biasing means connected between said lever and member urging one end of the slot against said first pivot means for transmitting a predetermined low reaction force from said second pivot means to said first pivot to cause rotation of said lever and member relative to said support about said first pivot means to provide a long lever arm for said lever from said first pivot means to said force output means and thereafter permitting relative rotation between said lever and member, means operatively associated with said member and support operative to prevent rotation of said member in the opposite direction to fix said member relative to said support to cause rotation of said lever about said second pivot means relative to said support to provide a short lever arm from said second pivot means to said force output means.

13. In a brake lever mechanism, a support, a member, first pivot means pivotally mounting said member on said support for movement about a fixed axis, a brake lever, second pivot means pivotally mounting said brake lever on said member for relative movement therebetween about another axis whereby said another axis is movable with said member about said fixed axis, said brake lever having spaced force input means and force output means, said fixed axis being located a predetermined distance from said force output means, said another axis being located a distance less than said predetermined distance from said force output means, and pivot shift means connected between said member, said lever and support to cause said member and lever to move together and pivot about said fixed axis and operative in response to a predetermined force reacting on said force output means to non-rotatably anchor said member to said support and permit said lever to move relative to said member about said another axis to provide a larger mechanical advantage said pivot shift means including a stop on said lever, a spring connected between said lever and member preloaded to urge said stop against said first pivot means for movement of said member and lever together and deflectable to permit said lever to move relative to said member.

14. The invention defined in claim 13 and holding means operatively associated with said lever and member operative to hold said lever in a plurality of adjusted positions with respect to said member, and means operatively associated with said holding means and pivot shift means operative to release said holding means and to actuate said pivot shaft means to permit return movement of said member.

15. In a lever mechanism, a support, a lever having spaced force input and force output means, pivot supporting means including a pair of pivot means supporting said lever on said support for pivotal movement selectively and alternately about a first axis determined by one pivot means and a second axis determined by the other pivot means, said first and second axes being located to provide different mechanical advantage, and pivot shift means including spring loaded engageable stop means associated with said lever and pivot supporting means operative on said pivot supporting means to shift said lever from pivotal movement about said first axis to pivotal movement about said second axis in response to the amount of force transmitted by said lever.

16. In a lever mechanism, a support, a lever having spaced force input means and force output means and a force transmitting portion for transmitting force from said force input means to said force output means during rotation in one direction about an axis, pivot supporting means supporting said lever on said support and including a pair of pivot means and a member, said member being pivoted by one pivot means to said lever for relative movement therebetween about a first axis and by the other pivot means to said support for relative movement therebetween about a second axis, said first and second axes being spaced from said force output means to provide a pair of different moment arms for said lever, and pivot shift means operatively associated with said lever, said support and pivot supporting means operative in response to a change in the force being transmitted by said lever to selectively and alternately pivot said lever about said first and second axis to vary the moment arms of said lever, said pivot shift means including a stop on said lever, a spring connected to said lever and member preloaded to urge said lever stop to operatively engage said member to condition said lever for pivoting about said second axis and deflectable to condition said lever for pivoting about said first axis.

17. In a lever mechanism, a support, a lever having spaced force input and force output means and a force transmitting portion providing a fulcrum point whereby when said lever is pivoted about said fulcrum point said force transmitting portion transmits force from said force input means to said force output means and causes a reaction force at said fulcrum point, pivot supporting means pivotally supporting said lever on said support including a member pivotally connected to said lever at said fulcrum point for relative movement therebetween about a first axis passing through said fulcrum point and pivotally connected to said support for pivotal movement about an axis spaced from said first axis, and pivot shift means operatively associated with said lever, said support and pivot supporting means operative in response to the amount of reaction force at said fulcrum point to change the effective pivotal connection between said lever and said support from the pivotal connection between said lever and member to the pivotal connection between said member and support said pivot shift means including a spring loaded pin and slot connection operatively connecting said lever and member.

References Cited by the Examiner
UNITED STATES PATENTS

| | | | |
|---|---|---|---|
| 1,797,329 | 3/31 | Constantine | 74—512 |
| 2,162,052 | 6/39 | Bird | 74—530 |
| 2,287,037 | 6/42 | Jandus | 74—516 |
| 2,507,997 | 5/50 | Roedding et al. | 74—155 X |
| 2,985,032 | 5/61 | Schroder et al. | 74—516 X |

FOREIGN PATENTS 284,649    12/52    Switzerland.

BROUGHTON G. DURHAM, *Primary Examiner.*

UNITED STATES PATENT OFFICE
CERTIFICATE OF CORRECTION

Patent No. 3,216,276 November 9, 1965

Laszlo Nagy

It is hereby certified that error appears in the above numbered patent requiring correction and that the said Letters Patent should read as corrected below.

Column 3, line 30, for "(FIG. 1" read -- (FIG. 1) --; column 7, lines 39 to 41, strike out "associated with said member and support operatively associated with said first and second holding means and said control means operative to prevent rotation of" and insert instead -- associated with said member and support to prevent rotation of --; column 8, line 26, for "pivot to cause" read -- pivot means to cause --.

Signed and sealed this 6th day of September 1966.

(SEAL)
Attest:

ERNEST W. SWIDER
Attesting Officer

EDWARD J. BRENNER
Commissioner of Patents